June 24, 1941.    R. G. LORRAINE    2,247,062
PHASE BALANCE CONDITION RESPONSIVE DEVICE
Filed Dec. 16, 1939
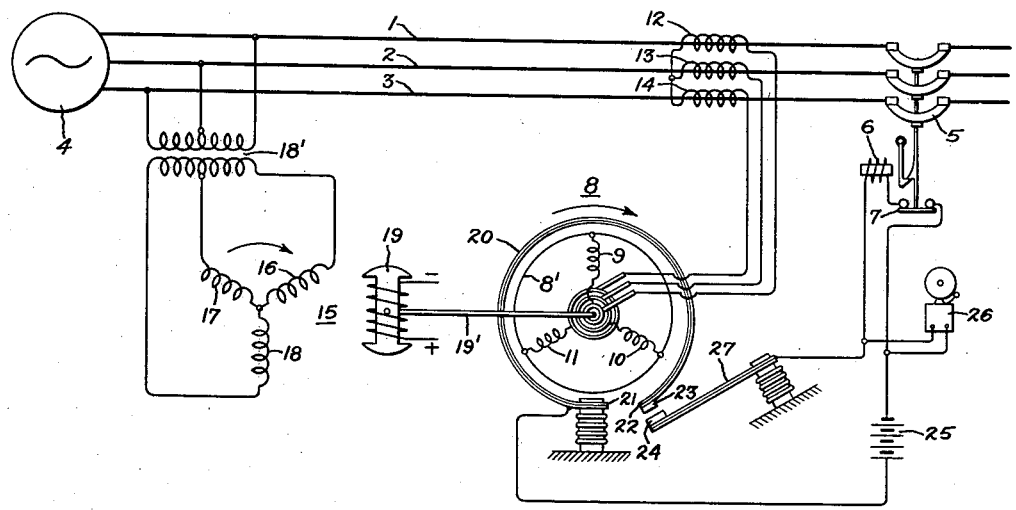
Inventor:
Richard G. Lorraine,
by Harry E. Dunham
His Attorney.

Patented June 24, 1941

2,247,062

UNITED STATES PATENT OFFICE 2,247,062

PHASE BALANCE CONDITION RESPONSIVE DEVICE

Richard G. Lorraine, Schenectady, N. Y., assignor to General Electric Company, a corporation of New York Application December 16, 1939, Serial No. 309,627

13 Claims. (Cl. 175—294)

My invention relates to improvements in phase balance condition responsive devices and more particularly to electroresponsive devices which operate in dependence on the condition of balance of a plurality of similar time sequence related electric quantities of a polyphase circuit, such for example as the currents in the three phase conductors of a three-phase circuit, the voltages between these conductors, the voltages to neutral of these conductors, etc.

It is well known that an $n$-phase system of similar time sequence related electric quantities can be resolved into $(n-1)$ symmetrical systems and an asymmetrical system. Thus, for example, an unbalanced three-phase system of currents can be resolved into positive and negative phase sequence component symmetrical systems and may also, under certain conditions, include a zero phase sequence or asymmetrical component. Such conditions of unbalance may arise in case of unequal phase currents due to faults, different phase loadings, etc. If this unbalance is great enough, excessive rotor heating results. This heating is likely to damage machines permanently.

One object of my invention is to provide an improved electroresponsive device which is operative in dependence on a symmetrical component of a polyphase alternating current circuit. Another object of my invention is to provide an improved and yet relatively simple device which is operative quickly to detect any unbalance so that suitable action may be taken to avoid the dangerous effects consequent upon such unbalance if allowed to continue or to become more intense. These and other objects of my invention will appear in more detail hereinafter.

My invention will be better understood from the following description when considered in connection with the accompanying drawing, and its scope will be pointed out in the appended claims.

The single figure of the accompanying drawing diagrammatically illustrates an embodiment of my invention as applied to a three-phase alternating current circuit comprising phase conductors 1, 2 and 3 which are energized by a generator 4. This circuit may be connected to a load through a circuit breaker 5 which, as shown, is of the latched closed type. Also, as illustrated, this circuit breaker is provided with a trip coil 6 and an "a" auxiliary switch 7 which is closed when the breaker is closed and opened when the breaker is opened.

For the purpose of illustrating my invention, I have shown an embodiment thereof which is operative in dependence on the negative phase sequence component of the current in the circuit 1, 2, 3 so as to detect unbalance in the currents in the phase conductors of this circuit. As shown, this embodiment of my invention includes an induction dynamoelectric machine, such as a wound rotor induction machine 8, whose rotor windings 9, 10 and 11 are so connected to the phase conductors 1, 2 and 3, respectively, as to produce a flux field dependent on the currents in these conductors and rotating in a given direction during certain circuit conditions. For this purpose the windings 9, 10 and 11 may be connected to be energized from the current transformers 12, 13 and 14, respectively, which are connected in the phase conductors 1, 2 and 3, respectively. Thus, for example, under balanced current conditions in the phase conductors 1, 2 and 3, the direction of rotation of this flux field is counterclockwise, but under conditions of current unbalance in the phase conductors 1, 2, 3, there will also be a clockwise rotating flux field.

In order to obtain a desired operating effect by reason of the occurrence of this second rotating field, the rotor 8' is arranged to be synchronously rotated in a clockwise direction so that the counterclockwise rotating field of the rotor is in effect at a standstill. For this synchronous actuation there may be employed any suitable means such as a synchronous motor 15 whose field windings 16, 17 and 18 are connected to be energized by the voltages of the respective phases through suitable means, such as an open delta-connected potential transformer 18', so that the direct current excited rotor 19 on a shaft 19' with the rotor 8' is caused to rotate in a clockwise direction since this is opposite to the direction of rotation of the positive phase sequence component field in the rotor 8' of the induction machine 8. Since on the occurrence of unbalance in the currents in the phase conductors 1, 2, 3 there is a clockwise rotating field produced by the rotor windings 9, 10, 11 of the induction machine 8, the resultant of this rotation, which is the same direction as the actual mechanical rotation of the rotor, is, as viewed from a stationary point, a double frequency flux field which may be used as the criterion of unbalance.

In order to make use of this criterion, I provide, in accordance with my invention, adjacent the rotor 8' of the induction machine 8 a thermoresponsive element 20 of suitable electric current conducting material. As illustrated, this element is in the form of a slit cylinder of bimetallic material around the rotor 8'. One edge 21 of the slit is suitably fixed and insulated while the other edge 22 is free to move in space in dependence on the thermal condition of the element 20. Since the element 20 is of electric current conducting material and positioned in the flux field of the rotor 8', eddy currents will be induced in the element 20 corresponding to the double frequency flux produced by the rotor. In consequence of these double frequency currents, heating of the bimetallic element 20 will be effected to cause movement of the free edge 22 thereof.

In order to make this movement effective to obtain a suitable operation in response to phase unbalance, a contact 23 may be mounted on the movable edge of the bimetallic element 20 to co-operate with a contact 24 so that, when these contacts are closed, a circuit may be completed from a suitable source 25 to an alarm device, such as a bell 26, or to complete the circuit of the trip coil 6 of the circuit breaker 5 whereby to take the unbalanced load off from the generator 4.

In order to prevent a false action of devices embodying my invention in consequence of variation in temperature of the circumambient medium, I provide means for compensating for such variation. Thus, for example, as shown, the contact 24 may be mounted on a suitably insulated bimetallic strip 27 so reversely positioned with respect to the bimetallic element 20 as to compensate for any variation in temperature of the circumambient medium. In other words, the contact 24 will follow the contact 22 for temperature decrease and will travel away from it on temperature increase without effectively changing the contact gap which has to be closed in response to actual heating of the bimetallic element 20 by the double frequency flux appearing on the occurrence of phase unbalance.

While the illustrated embodiment of my invention is connected to be responsive in dependence on a negative sequence component of the circuit current, it can be made responsive to a positive sequence component of the circuit current by simply reversing the connections of two of the rotor windings 9, 10 and 11 as will be obvious to those skilled in the art. Thus, for example, the device may be made responsive to a positive sequence component of current by reversing the connections of the windings 9 and 11. It will also be obvious to those skilled in the art that the device may be made responsive to positive or negative phase sequence components of voltage by suitably connecting the windings 9, 10 and 11 to be energized in accordance with similar polyphase voltages derived from the circuit 1, 2, 3 either directly or through the medium of potential transformers. For correct operation in any application of my invention, the means used to drive the rotor 8' at synchronous speed should be capable of providing a rotative effect in excess of any counter-rotative effect of the rotor 8' under any condition of circuit balance.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. Means operative in dependence on a symmetrical component of a three-phase alternating current circuit comprising an induction dynamoelectric machine having a wound rotor whose windings are connected to the circuit to produce a flux field rotating in a given direction during predetermined circuit conditions, means for synchronously rotating said rotor in the same direction as said flux field, a thermoresponsive element of electric current conducting material adjacent said rotor, and means operated by said thermoresponsive element on eddy current heating thereof in consequence of the double frequency flux of said rotor.

2. Means operative in dependence on a symmetrical component of a polyphase alternating current circuit comprising an induction dynamoelectric machine having a wound rotor whose windings are connected to the circuit to produce a flux field rotating in a given direction during predetermined circuit conditions, means for synchronously rotating said rotor in the same direction as said flux field, a slit cylindrical element of bimetallic material around said rotor one edge of said slit being fixed and the other edge free to move in response to a change in the thermal condition of said element on eddy current heating thereof in consequence of the double frequency flux of said rotor, and means actuated by said element upon movement of the free edge thereof.

3. Means responsive to phase unbalance in a polyphase alternating current circuit comprising an induction dynamoelectric machine having a wound rotor whose windings are connected to the circuit and a thermoresponsive element of electric current conducting material adjacent said rotor, means for synchronously actuating said rotor, and means operable by said thermoresponsive element on eddy current heating thereof due to the appearance of a double frequency flux field produced by rotation of said rotor and in consequence of phase unbalance in said circuit.

4. Means responsive to phase unbalance in a polyphase alternating current circuit comprising an induction dynamoelectric machine having a wound rotor whose windings are connected to the circuit and a thermoresponsive element of electric current conducting material adjacent said rotor, means for synchronously actuating said rotor, contact means operable by said thermoresponsive element on eddy current heating thereof due to the appearance of a double frequency flux field produced by rotation of said rotor and in consequence of phase unbalance in said circuit, and means for preventing a false operation of said contact means in consequence of variation in temperature of the circumambient medium.

5. Means responsive to an unbalance in $n$ similar time sequence related electric quantities of an $n$-phase alternating current circuit, $n$ being an integer greater than 1, comprising an induction dynamoelectric machine having a wound rotor whose windings are connected to the circuit and a slit cylindrical element of bimetallic material around said rotor one edge of said slit being fixed and the other edge free to move in response to a change in the thermal condition of said element, means for synchronously actuating said rotor, and contact means actuated by said element upon movement of the free edge thereof because of eddy current heating of the element due to the appearance of a flux field produced by rotation of said rotor and in consequence of unbalance in said $n$ similar time sequence related electric quantities.

6. Means responsive to an unbalance in $n$ similar time sequence related electric quantities of an $n$-phase alternating current circuit, $n$ being an integer greater than 1, comprising an induction dynamoelectric machine having a wound rotor whose windings are connected to the circuit and a slit cylindrical element of bimetallic material around said rotor one edge of said slit being fixed and the other edge free to move in response to a change in the thermal condition of said element, means for synchronously actuating said rotor, a contact mounted on said element adjacent the free edge thereof, and a cooperating contact engageable by the contact on said element on eddy current heating thereof due to the appearance of a flux field produced by rotation of said rotor and in consequence of unbalance in said $n$ similar time sequence related electric quantities.

7. Means operative in dependence on a symmetrical component of a polyphase alternating current circuit comprising an induction dynamoelectric machine having a wound rotor whose windings are connected to the circuit to produce a flux field rotating in a given direction during predetermined circuit conditions, means connected to the circuit for synchronously rotating said rotor in the same direction as said flux field, a slit cylindrical element of bimetallic material around said rotor one edge of said slit being fixed and the other edge free to move in response to a change in the thermal condition of said element on eddy current heating thereof in consequence of the double frequency flux produced by rotation of said rotor, indicating means actuable in response to the movement of the free edge of said element, and means for preventing a false operation of said indicating means in consequence of variation in temperature of the circumambient medium.

8. Means responsive to an unbalance in $n$ similar time sequence related electric quantities of an $n$-phase alternating current circuit, $n$ being an integer greater than 1, comprising an induction dynamoelectric machine having a wound rotor whose windings are connected to the circuit and a slit cylindrical element of bimetallic material around said rotor one edge of said slit being fixed and the other edge free to move in response to a change in the thermal condition of said element, means connected to the circuit for synchronously actuating said rotor, cooperating contacts including a contact mounted on the free edge of said element, said contacts being operable to a circuit-controlling position by said element on eddy current heating thereof due to the appearance of a flux field produced by rotation of said rotor and in consequence of unbalance in said $n$ similar time sequence related electric quantities, and means for preventing a false circuit-controlling action of said contacts due to variation in temperature of the circumambient medium.

9. Means responsive to an unbalance in $n$ similar time sequence related electric quantities of an $n$-phase alternating current circuit, $n$ being an integer greater than 1, comprising an induction dynamoelectric machine having a wound rotor whose windings are connected to the circuit and a slit cylindrical element of bimetallic material around said rotor one edge of said slit being fixed and the other edge free to move in response to a change in the thermal condition of said element, means connected to the circuit for synchronously actuating said rotor, a contact mounted on said element adjacent the free edge thereof, a cooperating contact engageable by the contact on said element on eddy current heating thereof due to the appearance of a flux field produced by rotation of said rotor and in consequence of unbalance in said $n$ similar time sequence related electric quantities, and means for mounting said cooperating contact to compensate for variation in temperature of the circumambient medium.

10. Means responsive to an unbalance in $n$ similar time sequence related electric quantities of an $n$-phase alternating current circuit, $n$ being an integer greater than 1, comprising an induction dynamoelectric machine having a wound rotor whose windings are connected to the circuit and a slit cylindrical element of bimetallic material around said rotor one edge of said slit being fixed and the other edge free to move in response to a change in the thermal condition of said element, means connected to the circuit for synchronously actuating said rotor, and cooperating contacts including a contact mounted on the free edge of said element, said contacts being operable to a circuit controlling position by said element on eddy current heating thereof due to the appearance of a flux field produced by rotation of said rotor and in consequence of unbalance in said $n$ similar time sequence related electric quantities.

11. Means responsive to the condition of balance of $n$ similar time sequence related electric quantities of an $n$-phase alternating current circuit comprising an induction dynamoelectric machine having a wound rotor whose windings are connected to the circuit to produce a flux field rotating in a given direction during predetermined circuit conditions, means for synchronously rotating said rotor in the same direction as said flux field, a thermoresponsive element of electric current conducting material adjacent said rotor, and means operated by said thermoresponsive element on eddy current heating thereof due to the appearance of a flux field produced by rotation of said rotor and dependent on the condition of balance in said $n$ similar time sequence related electric quantities.

12. Means responsive to an unbalance in a polyphase electric quantity system of an electric circuit comprising polyphase windings connected to said circuit, a thermo-responsive element of electric current conducting material in inductive relation to said windings, means for producing relative movement between said material and said windings so that under balanced conditions of said system no eddy currents are produced in said material but under unbalanced conditions of said system eddy currents are produced in said material, and means operated by said element in response to a predetermined heating thereof.

13. Means responsive to the condition of balance of a polyphase electric quantity system of an electric circuit comprising polyphase windings connected to said circuit, a thermoresponsive element of electric current conducting material in inductive relation to said windings, means for producing relative movement between said material and said windings so that under certain conditions of balance of said system no eddy currents are produced in said material but under other conditions of balance of said system eddy currents are produced in said material, and means operated by said element in response to a predetermined heating thereof.

RICHARD G. LORRAINE.